(12) United States Patent
Bartol

(10) Patent No.: US 7,677,095 B1
(45) Date of Patent: Mar. 16, 2010

(54) METHOD FOR PROVIDING ENHANCED STABILITY OF A VEHICLE WITH A DEFLATED TIRE

(75) Inventor: Mark Bartol, Farmington Hills, MI (US)

(73) Assignee: Kelsey-Hayes Company, Livonia, MI (US)

( * ) Notice: Subject to any disclaimer, the term of this patent is extended or adjusted under 35 U.S.C. 154(b) by 577 days.

(21) Appl. No.: 11/636,844

(22) Filed: Dec. 11, 2006

(51) Int. Cl.
*G01M 17/02* (2006.01)

(52) U.S. Cl. .................................... 73/146.2

(58) Field of Classification Search .............. 73/115.01, 73/117.01, 121, 128, 129, 146, 146.2, 146.3, 73/146.4, 146.5

See application file for complete search history.

(56) References Cited

U.S. PATENT DOCUMENTS

| | | | |
|---|---|---|---|
| 4,876,528 | A | 10/1989 | Walker et al. |
| 5,247,831 | A | 9/1993 | Fioravanti |
| 5,546,308 | A | 8/1996 | Yamamoto |
| 5,591,906 | A | 1/1997 | Okawa et al. |
| 5,721,374 | A | 2/1998 | Siekkinen et al. |
| 5,979,995 | A | 11/1999 | Miyazaki |
| 6,121,895 | A | 9/2000 | Beeson |
| 6,122,585 | A | 9/2000 | Ono et al. |
| 6,161,431 | A | 12/2000 | Drähne et al. |
| 6,183,010 | B1 | 2/2001 | Daoud |
| 6,212,464 | B1 | 4/2001 | Skotnikov |
| 6,219,604 | B1 | 4/2001 | Dilger et al. |
| 6,250,421 | B1 | 6/2001 | Poshadlo |
| 6,259,361 | B1 | 7/2001 | Robillard et al. |
| 6,272,418 | B1 | 8/2001 | Shinmura et al. |
| 6,278,361 | B1 | 8/2001 | Magiawala et al. |
| 6,281,787 | B1 | 8/2001 | Lerg et al. |
| 6,285,280 | B1 | 9/2001 | Wang |
| 6,330,496 | B1 | 12/2001 | Latarnik et al. |
| 6,343,249 | B1 | 1/2002 | Sakai et al. |
| 6,614,343 | B1 | 9/2003 | Fennel et al. |
| 6,622,074 | B1 | 9/2003 | Coelingh et al. |
| 6,873,891 | B2 | 3/2005 | Moser et al. |
| 7,292,924 | B2 * | 11/2007 | Milot .......................... 701/70 |
| 2001/0025679 | A1 | 10/2001 | Dufournier et al. |
| 2002/0032513 | A1 | 3/2002 | Faye |
| 2003/0058118 | A1 | 3/2003 | Wilson |

(Continued)

FOREIGN PATENT DOCUMENTS

CN      1341519      3/2002

(Continued)

OTHER PUBLICATIONS

International Search Report from International Application No. PCT/US 03/13290.

(Continued)

*Primary Examiner*—Erik S McCall
(74) *Attorney, Agent, or Firm*—MacMillan, Sobanski & Todd, LLC

(57) ABSTRACT

In a motor vehicle equipped with pneumatic tires and a hydraulically actuated wheel brake system, a method for enhancing stability of the vehicle by determining whether any tire on the vehicle is deflated, determining the current magnitude of brake pressure at the wheel of the deflated tire when the brakes are applied, and reducing the current magnitude of brake pressure at the wheel of the deflated tire.

13 Claims, 4 Drawing Sheets

U.S. PATENT DOCUMENTS

2005/0080546 A1 * 4/2005 Milot .................. 701/70

FOREIGN PATENT DOCUMENTS

| DE | 19744725 A1 | 4/1999 |
|---|---|---|
| EP | 1 291 230 | 3/2003 |
| JP | 02-241864 A | 9/1990 |
| JP | 07-205830 A | 8/1995 |
| JP | 07-257349 A | 10/1995 |
| JP | 09-099723 A | 4/1997 |
| WO | 90/05646 | 5/1990 |
| WO | 01/08908 | 2/2001 |
| WO | 01/89898 | 11/2001 |
| WO | 02/057099 | 7/2002 |

OTHER PUBLICATIONS

English language abstract of CN 1341518.

* cited by examiner

METHOD FOR PROVIDING ENHANCED STABILITY OF A VEHICLE WITH A DEFLATED TIRE

CROSS-REFERENCE TO RELATED APPLICATIONS

Not Applicable

BACKGROUND OF THE INVENTION

This invention relates in general to a control method for enhancing stability of a vehicle by adjusting brake pressure following deflation of a tire to a lower pressure.

In the event of a rapid tire deflation or blowout in a motor vehicle, the deflated tire is unable to support the same forces and moments as the inflated tire on the opposite side of the same axle.

At least two factors are important in this respect. First, the longitudinal force between the road and the tire created by a given braking torque can be lower for a deflated tire than an inflated tire because a delay in transmitting brake torque to the road is increased at the deflated tire. Therefore, there is a brief period during which the inflated tire is creating a larger force. Additionally, the maximum coefficient of friction between the tire and road may be decreased in a deflated tire, thereby reducing the maximum longitudinal force that can be created between the tire and road. The result, in either case, is a difference in magnitude of longitudinal forces at the left and right wheels of a given axle, which induces a yaw moment on the vehicle and tends to cause the vehicle to yaw or spin. The driver can counteract this yaw with steering input if his reaction is quick enough, if his reaction is correct, and if adequate lateral force capability exists at the tires.

Second, the lateral force that can be supported by a deflated tire is greatly reduced when compared to an inflated tire. Therefore, if the vehicle is turning, there may be inadequate lateral force to maintain the desired turning radius. With a front tire, the result is understeer, which induces the vehicle to plow out of the turn, while with a rear tire, the result is oversteer, which induces vehicle yawing or spinning about a vertical axis. Application of braking forces to a tire reduces its lateral force support capability, so applying braking force to a deflated tire further reduces its capability.

These two factors can work singly or in combination such that a vehicle, initially going in a straight line, may be caused to spin by the first factor. The second factor causes inadequate lateral force capability to control the spin which then may increase out of control.

Driver reaction to a blowout is often a rapid release of the throttle and application of the brakes. The brakes generate roughly equal pressures at both the inflated and deflated tire on the affected axle. These equal pressures may result in unequal forces and moments on the vehicle as described above. Therefore, it would be desirable to provide a system and method for enhancing stability of a vehicle with a deflated tire.

BRIEF SUMMARY OF THE INVENTION

This invention relates to a method for enhancing stability of a motor vehicle equipped with pneumatic tires and a hydraulically actuated wheel brake system. The method includes determining whether any tire on the vehicle is deflated, determining the current magnitude of brake pressure at the wheel of the deflated tire when the brakes are applied, and reducing the current magnitude of brake pressure at the wheel of the deflated tire. Preferably, brake pressure at both the left and right wheels at the front or rear axles where the deflated tire is located is reduced.

The invention also relates to a system for executing the method that employs active tire pressure monitoring sensors imbedded in the wheel and tire assemblies. The pressure sensors continually monitor tire pressure and provide a rapid indication of a deflated tire. Information from active sensors monitoring tire inflation pressure is used to invoke the response of an anti-lock brake system to enhance stability of the vehicle. Alternately, indirect techniques, such as wheel speed information, can be supplied as input information to an electronic controller to detect the presence of a deflated tire, instead using of tire pressure sensors for this purpose.

The method of the invention can be applied in combination with an anti-lock brake systems or more complex control systems, such as, for example, Traction Control and Vehicle Stability Control systems, that are capable of preventing brake pressure from occurring on an affected axle. In many cases, such systems are capable of preventing brake pressure from occurring at individual wheels based in response to determinations made by a controlling algorithm.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

BRIEF DESCRIPTION OF THE DRAWINGS

These and other advantages will become readily apparent to those skilled in the art from the following detailed description of a preferred embodiment when considered in the light of the accompanying drawings in which.

DETAILED DESCRIPTION OF THE PREFERRED EMBODIMENT

Figure 1:
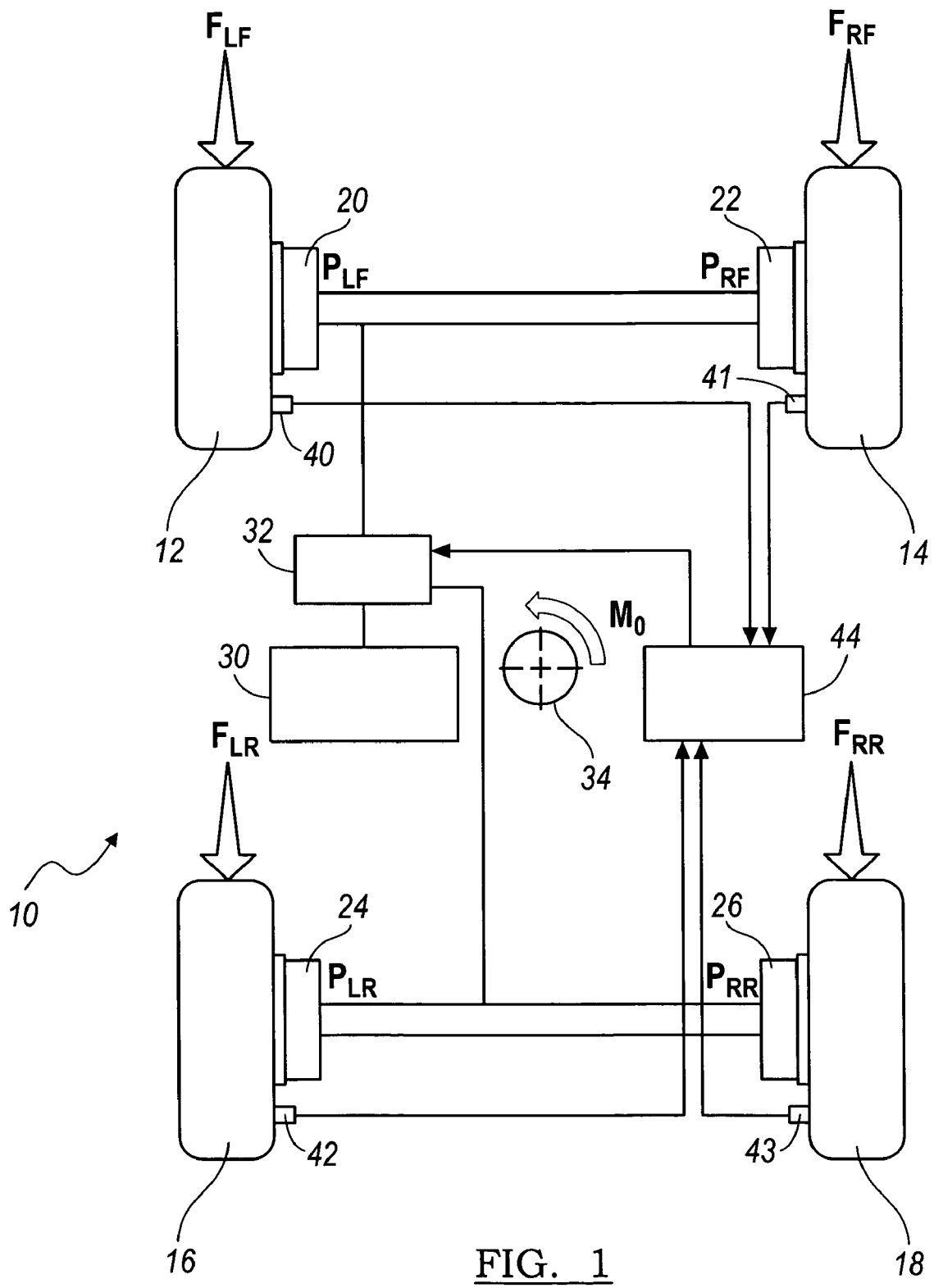
FIG. 1 is a schematic diagram of a motor vehicle wheel braking system.

Referring now to the drawings, there is illustrated in FIG. 1 a motor vehicle 10 that is supported on front wheels, each fitted with a tire 12, 14 and rear wheels, each fitted with a tire 16, 18. The rotational speed of the front wheels is controlled by front brakes 20, 22; the rotational speed of the rear wheels is controlled by rear brakes 24, 26. A source of brake pressure 30 is hydraulically connected through an anti-lock brake system (ABS) controller or vehicle stability control (VSC) modulator 32 to the front brakes, to which brake pressures $P_{LF}$ and $P_{RF}$ are applied and to the rear brakes, to which brake pressures $P_{LR}$ and $P_{RR}$ are applied. In the following description, the front wheels 12 and 14 are sometimes referred to as the front axle; while the rear wheels 16 and 18 are sometimes referred to as the rear axle.

Under normal forward driving conditions when the front brakes are applied, the brake pressure source 30 delivers brake pressure that is approximately equal side-to-side and produces brake forces applied to the front left wheel $F_{LF}$ and front right wheel $F_{RF}$ that are approximately mutually equal. Under normal forward driving conditions, when the rear brakes are applied, the brake pressure source 30 delivers brake pressure that is approximately equal side-to-side and produces braking forces applied to the rear left wheel $F_{LR}$ and to the rear right wheel $F_{RR}$ that are approximately mutually equal, but are different in magnitude from the front brake forces. The brake pressures are not modified by the ABS or VSC modulator 32. The result is balanced tire-to-road forces that produce no significant moment $M_0$ about the vehicle center of gravity 34 and insignificant vehicle yaw.

In the preferred embodiment, active tire pressure monitoring devices 40, 41, 42, 43, imbedded in the wheel and tire assemblies, monitor tire pressure and rapidly provide a signal indicating a deflated or partially deflated tire. Alternatively, indirect methods, such as wheel speed information, can be used to detect indirectly a deflated tire state or condition. A signal from active tire pressure monitoring sensors or from an indirect tire pressure monitoring technique can be used as input to a vehicle stability controller 44.

With prior art brake systems, when a right front tire is deflated without corrective or compensatory control of the present invention, the brake pressure source 30 continues to deliver equal brake pressure $P_{LF}$ and $P_{RF}$ to the front brakes 20, 22, and those brake pressures are not modified by the ABS or VSC modulator 32 due to tire deflation. The front brakes 20, 22 produce forces between the front tires 12, 14 and the road surface $F_{LF}$ and $F_{RF}$, but in this case the front left $F_{LF}$ is significantly greater than the front right brake forces $F_{RF}$. The result is unbalanced front tire-to-road forces that produce a significant moment $M_0$ about the vehicle center of gravity 34, i.e., a significant vehicle yaw moment. The rear brakes continue to be supplied with equal brake pressure and produce mutually equal brake forces, as in the normal operating condition.

The present invention contemplates that, when a left front tire is deflated and the brake system operates under corrective, compensatory control, the brake pressure source 30 continues to deliver equal brake pressure $P_{LF}$ and $P_{RF}$ to the front brakes 20, 22; however, the left front brake pressure is reduced to a magnitude that can be supported by the deflated tire. The front brakes 20, 22 produce forces between the front tires 12, 14 and the road surface $F_{LF}$ and $F_{RF}$ that are mutually equal but less than the brake forces produced during normal operation. The result is tire-to-road forces that produce an insignificant moment $M_0$ about the vehicle center of gravity 34, i.e., an insignificant vehicle yaw moment. The rear brakes continue to be supplied with equal brake pressure and produce mutually equal brake forces, as in the normal operating condition. A similar reduction in the pressure of a rear tire is controlled in a similar way as discussed for a front tire pressure reduction.

Figure 2:
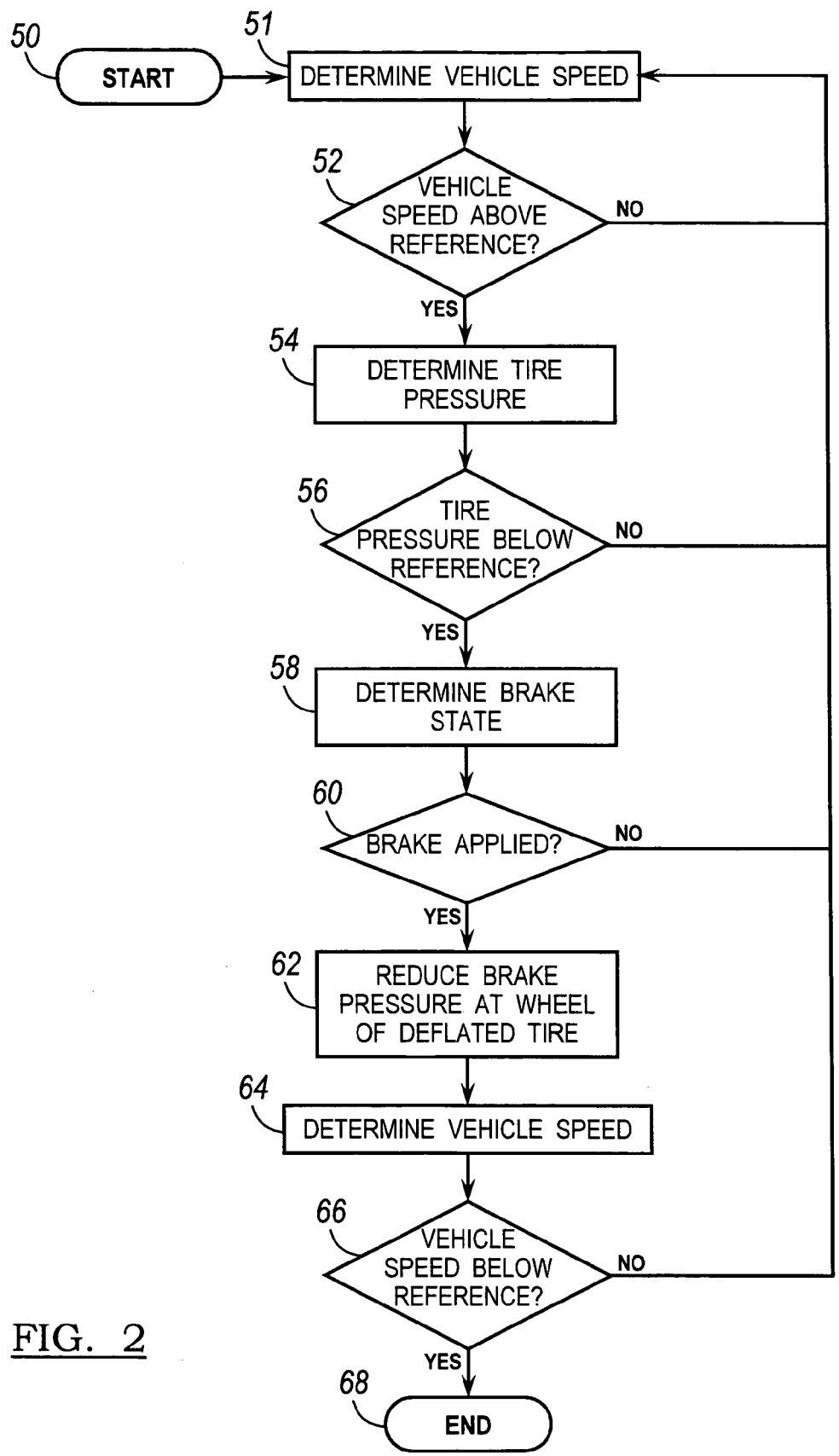
FIG. 2 is logic diagram showing the steps of a control algorithm for the braking system shown in FIG. 1.
Figure 3:
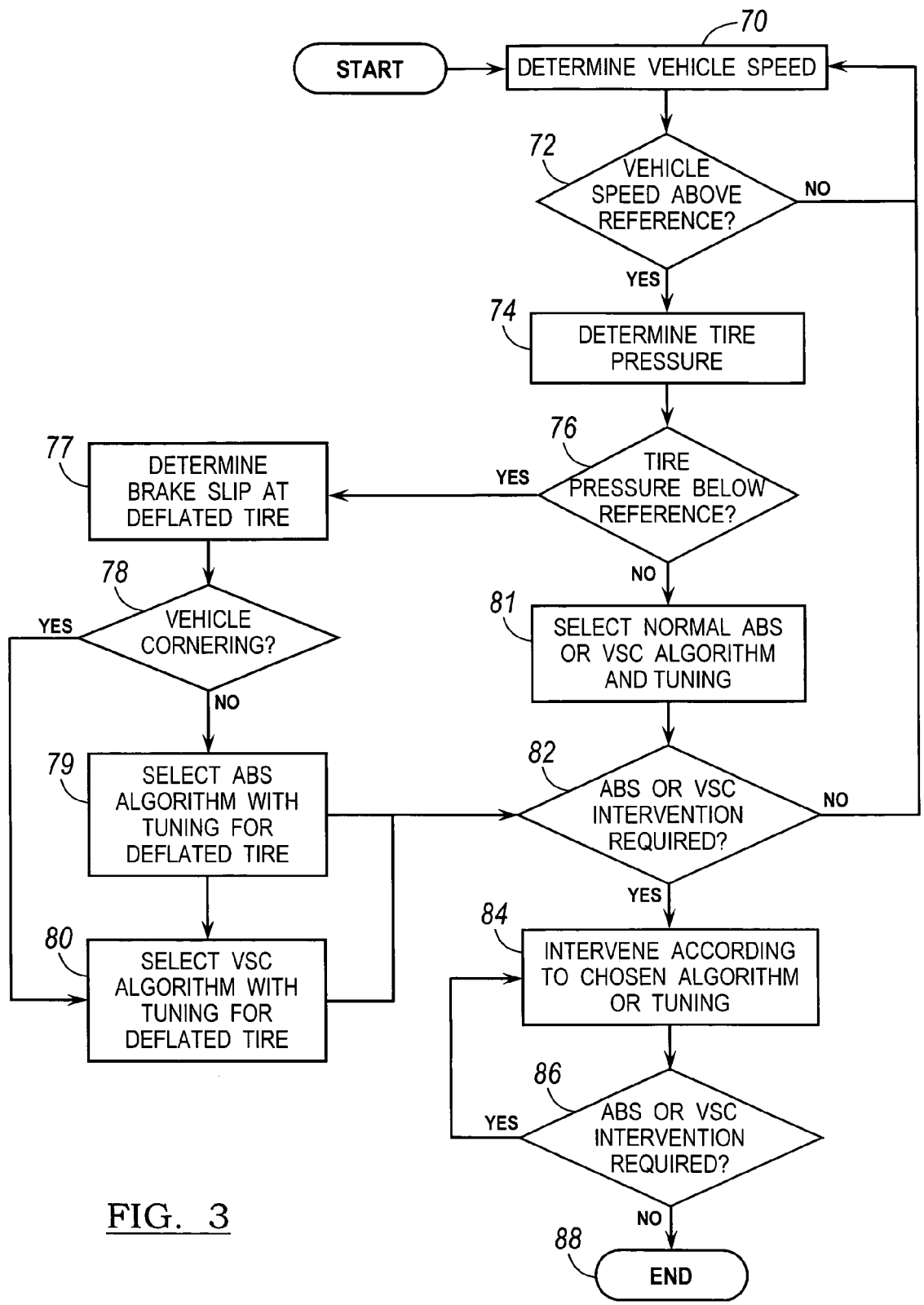
FIG. 3 is logic diagram showing an alternative embodiment of the control algorithm shown in FIG. 2.

In the event that a rapid loss of tire pressure is measured by the tire pressure monitoring sensors 40-43, the algorithms illustrated in FIGS. 2 and 3 employ the ABS or VSC system to prevent a rapid application of brake pressure at either wheel of the affected axle.

The algorithm of FIG. 2, which starts at step 50, instructs the ABS system to reduce any application of brake pressure to either wheel on the affected axle until the vehicle speed falls below a predetermined reference speed. If the reference speed is selected as being zero, the algorithm continues until the vehicle comes to rest. At step 51 vehicle speed is determined, and current vehicle speed is compared to a reference vehicle speed at step 52. At step 52, vehicle speed is compared to a predetermined reference vehicle speed. If vehicle speed is greater than the reference speed, i.e., if the test at step 52 is logically true, control passes to step 54, where controller 44 determines tire pressure from the signals produced by sensors 40-43. If the test at step 52 is logically false, control returns to step 51 and the algorithm is re-executed.

At step 56, current tire pressures are compared to a reference tire pressure to determine whether any tire is deflated. If the test at step 56 is logically false, control returns to step 51 and the algorithm is re-executed. If the test at step 56 is true, the applied or released state of the brake of the deflated tire is determined at step 58. If that brake is applied, the test at step 60 is true and control passes to step 62, where brake pressure applied to the deflated tire is reduced. If the test at step 60 is logically false, control returns to step 51 and the algorithm is re-executed.

Vehicle speed is determined again at step 64. At step 66, current vehicle speed is compared to a reference vehicle speed to determine whether the control can be terminated. If the test at step 66 is true, execution of the algorithm ends at 68. If the test at step 64 is logically false, control returns to step 51, and the algorithm is re-executed.

Control systems, such as vehicle stability control for enhancing vehicle stability, use additional sensors providing information such as steering wheel position, vehicle yaw rate and lateral acceleration to match the vehicle's yaw rate to the driver's intended yaw rate. The present invention contemplates that if a deflated tire is detected on a vehicle that includes such a vehicle stability control system, and the vehicle's yaw rate does not match the driver's intended yaw rate, the ABS or VSC system uses a different control algorithm or tuning to modify the vehicle yaw rate than it would have used had the deflated tire not been present.

The reduction in brake pressure produced at step 62 can be tuned to allow the development of a maximum yaw moment. The invention also contemplates a delay in the increase in brake pressure that can be tuned to allow the development of a yaw moment at a rate that can be counteracted by a steering input from the driver within typical reaction times. The reduction of brake pressure and delay in application of brake pressure could be combined to allow an increase in yaw moment that the driver could reasonably counteract, up to a maximum that could be controlled within the remaining lateral capability of the tires and reasonable steering wheel inputs. An alternative embodiment of the control algorithm shown in FIG. 3 includes these features.

At step 70 in FIG. 3, vehicle speed is compared to a predetermined reference vehicle speed. If vehicle speed is greater than the reference vehicle speed, i.e., if the test at step 72 is logically true, control passes to step 74, where controller 44 determines tire pressure from the signals produced by sensors 40-43. If the test at step 72 is logically false, control returns to step 70 and the algorithm is re-executed.

At step 76, current tire pressures are compared to a reference tire pressure to determine whether any tire is deflated. If at step 76, the algorithm determines that a tire is deflated, the algorithm next executes step 77, where wheel slip is calculated. Wheel slip is a speed difference between the actual speed of a wheel and a calculated wheel speed that corresponds to the current vehicle speed. A positive wheel slip occurs when the actual wheel speed is less than the calculated wheel speed that corresponds to current vehicle speed with the vehicle driving straight and not cornering. Normally target wheel slip is in a range of about 5-15 percent, a range that ensures adequate frictional contact with the road surface with the vehicle not cornering. Corrective action when the vehicle is not cornering includes reducing slip at both wheels of the front or rear axle, the axle where the deflated tire is located.

Figure 4:
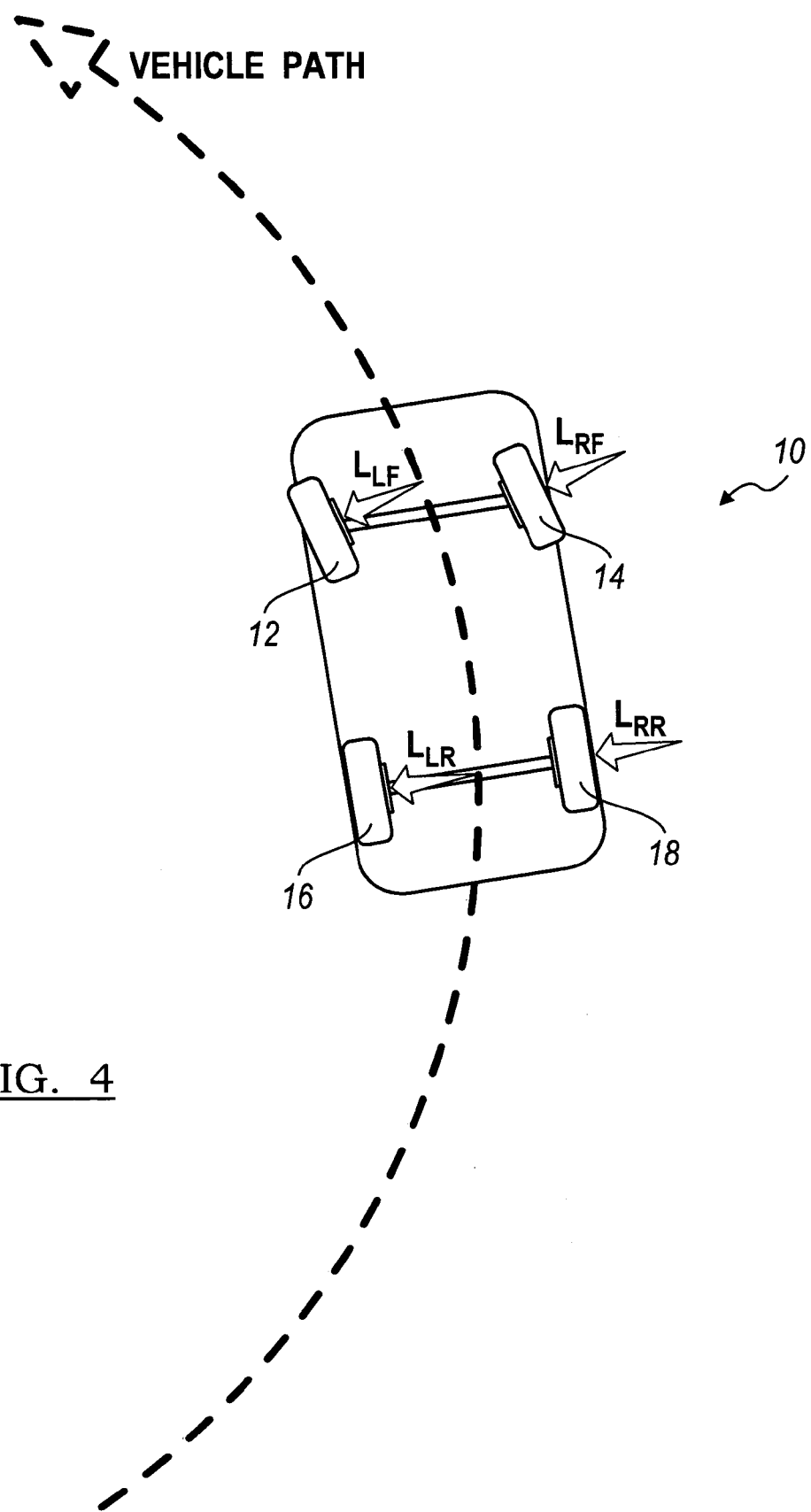
FIG. 4 is schematic diagram a cornering vehicle showing the lateral loads at the wheels.

At step 78, it is determined whether or not the vehicle is cornering. When a vehicle 10 is cornering, the vehicle maintains a controlled turn due to lateral forces between the tire and road $L_{LF}$ $L_{RF}$ $L_{LR}$ $L_{RR}$, as shown in FIG. 4. These lateral forces cause the vehicle to follow its curved path and to rotate so that it is always facing in its direction of travel. When a vehicle is cornering with a deflated tire, the lateral forces needed at the deflated tire-road interface may be too high to maintain vehicle stability. Application of braking forces to a tire reduces its lateral force support capability. Therefore, application of braking force to a deflated tire further reduces its capability. These factors cause difficulty in keeping the vehicle in the turn. Corrective action when the vehicle is cornering includes reducing the magnitude of brake pressure applied to the wheels of the axle at which the deflated tire is located.

If the test at step 78 is false and the vehicle is not cornering, at step 79 an alternative ABS algorithm and tuning is selected that determines the magnitude of a reduction in wheel slip to a lower slip than the current target slip. For example, if the current target wheel slip is six percent, the algorithm reduces slip at both wheels of the front or rear axle, the axle where the deflated tire is located, to about two percent by decreasing brake pressure sent from the brake pressure source 30 to the wheels of the affected axle.

Alternatively, if the vehicle is cornering and the test at step 78 is true, at step 80 an alternative VSC algorithm and tuning is selected that determines the magnitude of a target reduction in brake pressure to be applied to the wheels of the affected axle, where the deflated tire is located.

If the test at step 76 is false, control passes to step 81, where an algorithm that produces normal ABS or VSC operation is selected.

In either case, control then passes to step 82 where a determination is made, using the result of steps 78 or 80, to determine whether brake system intervention is required for the desired algorithm or desired vehicle stability tuning. If brake intervention is required, at step 84 the appropriate change in brake pressure is commanded by controller 44. If brake intervention is not required, i.e., the test at step 82 is false, control passes to step 70, and the algorithm of FIG. 3 is re-executed.

At step 86, a check is made to determine if further brake intervention is required. Control passes to step 84 where the controller 44 commands a new brake pressure, if brake intervention is required. Execution of the algorithm ends at step 88, if brake intervention is not required.

The above could be accomplished without knowledge of wheel speeds, estimation of the yaw rate of the vehicle, or knowledge of the road surface. However, it is common for this information to be available to an ABS system or more complex control systems. With this information, unequal longitudinal forces during braking are controlled to prevent undesirable yaw, for example in cases in which the tire to road coefficient of friction is lower on one side of the vehicle (split-coefficient conditions) than the other while allowing as much deceleration as is practical. This invention proposes that the ABS system use the information provided by tire inflation monitoring systems so that, when a deflated tire is present and braking is occurring, the ABS system uses a different control algorithm or tuning to achieve yaw stability and deceleration optimization than it would have used, had the deflated tire condition not been present.

Although the embodiments of the control algorithms have been illustrated and described as applying to the front vehicle wheels, they may be applied to control the rear wheels or both the front and rear wheels.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for stabilizing a motor vehicle that includes hydraulically actuated wheel brakes and pneumatic tires supporting the vehicle, comprising the steps of:
    (a) determining whether any tire on the vehicle is deflated;
    (b) determining the location on the vehicle of the wheel at which a deflated tire is located;
    (c) determining the presence of excessive slip of any deflated tire determined in step (a); and
    (d) reducing the magnitude of brake pressure applied to the wheels at the axle where the deflated tire is located, if the current wheel slip at the deflated tire is greater than a target wheel slip.

2. The method of claim 1, wherein step (a) further includes:
    determining a reference tire pressure;
    monitoring the magnitude of pressure in the tires; and
    comparing the reference tire pressure to the magnitude of pressure in the tire.

3. The method of claim 1, wherein step (c) further includes:
    determining a target wheel slip;
    monitoring the magnitude of slip at the wheels; and
    comparing the current wheel slip at the location of the deflated tire and the target wheel slip.

4. The method of claim 1, wherein step (c) further includes:
    determining a target wheel slip;
    monitoring the magnitude of slip at the wheels;
    determining the current vehicle speed;
    using the vehicle speed to determine the current wheel slip at the at the location of the deflated tire; and
    comparing the current wheel slip at the location of the deflated tire and the target wheel slip.

5. The method of claim 1, wherein step (d) further includes:
    when the brakes are applied, determining a current magnitude of brake pressure applied to the wheel at the location of the deflated tire; and
    reducing, to a pressure that is less than said current magnitude of brake pressure, the magnitude of brake pressure applied to the wheels at the front or rear axles where the deflated tire is located.

6. The method of claim 1, wherein step (a) further includes:
    determining a reference tire pressure;
    monitoring the magnitude of pressure in the tires; and
    comparing the reference tire pressure to the magnitude of pressure in the tires; and
    the method further comprises:
    if the reference tire pressure is greater than the magnitude of pressure in the tires, maintaining unchanged the magnitudes of brake pressure applied to the wheels.

7. The method of claim 1 further comprising:
    determining the current vehicle speed;
    comparing the current vehicle speed to a reference vehicle speed; and
    performing steps (a), (b), (c) and (d) if the current vehicle speed is greater than the reference vehicle speed.

8. The method of claim 1, wherein step (c) further comprises:
    reducing, to a pressure that is less than said current magnitude of brake pressure, the magnitude of brake pressure applied to the wheels at the front or rear axles where the deflated tire is located.

9. A method for stabilizing motor vehicle that includes hydraulically actuated wheel brakes and pneumatic tires supporting the vehicle, comprising the steps of:
   (a) determining whether any tire on the vehicle is deflated;
   (b) determining the location on the vehicle of the wheel at which the deflated tire is located;
   (c) determining whether the vehicle is cornering; and
   (d) reducing the magnitude of brake pressure applied to the wheels at axle where the deflated tire is located, if the vehicle is cornering and a tire is deflated.

10. The method of claim 9 further comprising:
   determining the current vehicle speed;
   comparing the current vehicle speed to a reference vehicle speed; and
   performing steps (a), (b), (c) and (d) if the current vehicle speed is greater than the reference vehicle speed.

11. The method of claim 9, wherein step (a) further includes:
   determining a reference tire pressure;
   monitoring the magnitude of pressure in the tires; and
   comparing the reference tire pressure to the magnitude of pressure in the tire.

12. The method of claim 9, wherein step (d) further includes:
   when the brakes are applied, determining a current magnitude of brake pressure applied to the wheel at the location of the deflated tire; and
   reducing, to a pressure that is less than said current magnitude of brake pressure, the magnitude of brake pressure applied to the wheels at the front or rear axles where the deflated tire is located.

13. The method of claim 9, wherein step (a) further includes:
   determining a reference tire pressure;
   monitoring the magnitude of pressure in the tires; and
   comparing the reference tire pressure to the magnitude of pressure in the tires; and
the method further comprises:
   if the reference tire pressure is greater than the magnitude of pressure in the tires, maintaining unchanged the magnitudes of brake pressure applied to the wheels.

* * * * *